(12) United States Patent
Yan et al.

(10) Patent No.: US 11,880,464 B2
(45) Date of Patent: Jan. 23, 2024

(54) VULNERABILITY-DRIVEN CYBERATTACK PROTECTION SYSTEM AND METHOD FOR INDUSTRIAL ASSETS

(71) Applicant: General Electric Company, Schenectady, NY (US)

(72) Inventors: Weizhong Yan, Clifton Park, NY (US); Matthew Christian Nielsen, Soctia, NY (US); Aditya Kumar, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 391 days.

(21) Appl. No.: 17/405,387

(22) Filed: Aug. 18, 2021

(65) Prior Publication Data
US 2023/0058974 A1    Feb. 23, 2023

(51) Int. Cl.
*G06F 11/00* (2006.01)
*G06F 21/56* (2013.01)
(Continued)

(52) U.S. Cl.
CPC .......... *G06F 21/566* (2013.01); *G06F 21/577* (2013.01); *G06N 3/045* (2023.01); *G06N 20/00* (2019.01); *G06F 2221/034* (2013.01)

(58) Field of Classification Search
CPC ................. G06F 21/566; G06F 21/577; G06F 2221/034; G06N 20/00; G06N 20/10;
(Continued)

(56) References Cited

U.S. PATENT DOCUMENTS 9,203,859 B2    12/2015   Sampigethaya
9,923,915 B2    3/2018    Chiu et al.
(Continued)

FOREIGN PATENT DOCUMENTS

CN    110333689 A   * 10/2019
CN    110795874 A   *  2/2020
(Continued)

OTHER PUBLICATIONS

Goodfellow, Ian J. et al., "Explaining And Harnessing Adversarial Examples", International Conference on Learning Representations, arXiv:1412.6572v3 [stat.ML], Mar. 20, 2015, 11pgs.
(Continued)

*Primary Examiner* — Richard G Keehn
(74) *Attorney, Agent, or Firm* — Buckley, Maschoff & Talwalkar LLC

(57) ABSTRACT

According to some embodiments, a system, method and non-transitory computer readable medium are provided comprising a memory storing processor-executable steps; and a processor to execute the processor-executable steps to cause the system to: receive a first data value of a plurality of data values from a data store, wherein the first data value is from a digital twin model of an industrial asset; determine, via a vulnerability module, whether the received at least one data value is a near boundary case or not a near boundary case; in a case it is determined the first data value is a near boundary case, generate one or more adversarial samples for the first data value; input each of the one or more adversarial samples to the digital twin model; execute the digital twin model to output a system response for each input adversarial sample; determine whether the system response to each input adversarial sample has a negative impact; in a case it is determined the system response has a negative impact for a given input adversarial sample, update a trained attack
(Continued)

detection model with the given input adversarial sample; and generate a second decision boundary based on the updated trained attack detection model. Numerous other aspects are provided.

18 Claims, 12 Drawing Sheets

(51) Int. Cl.
*G06N 20/00* (2019.01)
*G06F 21/57* (2013.01)
*G06N 3/045* (2023.01)

(58) Field of Classification Search
CPC ...... G06N 3/045; G06N 3/0464; G06N 3/047; G06N 3/0475; G06N 3/084; H04L 63/1416; H04L 63/1425; H04L 63/1441; Y04S 40/20
See application file for complete search history.

(56) References Cited

U.S. PATENT DOCUMENTS

| | | | |
|---|---|---|---|
| 10,230,764 B2 | 3/2019 | Ng et al. | |
| 10,862,919 B2 | 12/2020 | Damodaran et al. | |
| 10,986,121 B2 | 4/2021 | Stockdale et al. | |
| 2019/0260781 A1 | 8/2019 | Fellows et al. | |
| 2022/0092234 A1* | 3/2022 | Karri | G06F 30/18 |
| 2022/0164502 A1* | 5/2022 | Pei | G06N 5/02 |
| 2022/0207217 A1* | 6/2022 | Lee | G06F 30/27 |
| 2022/0237345 A1* | 7/2022 | Yang | G05B 23/02 |

FOREIGN PATENT DOCUMENTS

| | | | |
|---|---|---|---|
| CN | 111080088 A | * | 4/2020 |
| CN | 111251304 A | * | 6/2020 |
| CN | 111596604 A | * | 8/2020 |
| CN | 113361139 A | * | 9/2021 |
| CN | 113534679 A | * | 10/2021 |
| CN | 112859739 B | * | 7/2022 |
| JP | 2021064370 A | * | 4/2021 |
| WO | WO-2017132134 A1 | * | 8/2017 |
| WO | WO-2022037068 A1 | * | 2/2022 |

OTHER PUBLICATIONS

Miley, Kathie, "AI-powered Cyber Attacks", F5 Labs, Dec. 30, 2020, downloaded from https://www.f5.comlabs/articles/cisotociso/ai-powered-cyber-attacks, retrieved Jun. 3, 2021, 5pgs.

Shakeel, Irfan, "Use AI to fight AI-powered cyber-attacks", AT&T Cybersecurity, Apr. 6, 2021, downloaded from https://cybersecurity.att.com/blogs/security essentials/use-ai-to-fight-ai-powered-cyber-attacks, retrieved Jun. 3, 2021, 4pgs.

* cited by examiner

VULNERABILITY-DRIVEN CYBERATTACK PROTECTION SYSTEM AND METHOD FOR INDUSTRIAL ASSETS

BACKGROUND

Industrial control systems that operate physical systems (e.g., associated with power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.) that could disrupt electric power generation and distribution, damage engines, inflict vehicle malfunctions, etc. Current methods primarily consider attack detection in Information Technology ("IT," such as, computers that store, retrieve, transmit, manipulate data) and Operation Technology ("OT," such as direct monitoring devices and communication bus interfaces). Cyber-attacks can still penetrate through these protection layers and reach the physical "domain." Such attacks can diminish the performance of a control system and may cause total shut down or even catastrophic damage to a plant. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable (e.g., when only one monitoring node, such as a sensor node, is used in a detection algorithm). Existing approaches to protect an industrial control system may include manually exploring possible attack scenarios, which may be very expensive and practically impossible. It would therefore be desirable to protect a cyber-physical system from cyber-attacks in an automatic and vulnerability-driven manner.

SUMMARY

According to some embodiments, a system is provided including a memory storing processor-executable steps; and a processor to execute the processor-executable steps to cause the system to: receive a first data value of a plurality of data values from a data store, wherein the first data value is from a digital twin model of an industrial asset; determine, via a vulnerability module, whether the received at least one data value is a near boundary case or not a near boundary case; in a case it is determined the first data value is a near boundary case, generate one or more adversarial samples for the first data value; input each of the one or more adversarial samples to the digital twin model; execute the digital twin model to output a system response for each input adversarial sample; determine whether the system response to each input adversarial sample has a negative impact; in a case it is determined the system response has a negative impact for a given input adversarial sample, update a trained attack detection model with the given input adversarial sample; and generate a second decision boundary based on the updated trained attack detection model.

According to some embodiments, a method is provided including receiving a first data value of a plurality of data values from a data store, wherein the first data value is from a digital twin model of an industrial asset; determining, via a vulnerability module, whether the received at least one data value is a near boundary case or not a near boundary case, wherein a near boundary case is a data value that is within a near boundary value of an initial decision boundary; in a case it is determined the first data value is a near boundary case, generating one or more adversarial samples for the first data value; inputting each of the one or more adversarial samples to the digital twin model; executing the digital twin model to output a system response for each input adversarial sample; determining whether the system response to each input adversarial sample has a negative impact; in a case it is determined the system response has a negative impact for a given input adversarial sample, updating a trained attack detection neural network with the given input adversarial sample; and generating a second decision boundary based on the updated attack detection model.

According to some embodiments a non-transitory computer readable medium storing program code is provided. The program code is executable by a computer system to cause the computer system to: receive a first data value of a plurality of data values from a data store, wherein the first data value is from a digital twin model of an industrial asset; determine, via a vulnerability module, whether the received at least one data value is a near boundary case or not a near boundary case; in a case it is determined the first data value is a near boundary case, generate one or more adversarial samples for the first data value; input each of the one or more adversarial samples to the digital twin model; execute the digital twin model to output a system response for each input adversarial sample; determine whether the system response to each input adversarial sample has a negative impact; in a case it is determined the system response has a negative impact for a given input adversarial sample, update a trained attack detection neural network with the given input adversarial sample; and generate a second decision boundary based on the updated attack detection model.

Some technical advantages of some embodiments disclosed herein are improved systems and methods to protect one or more cyber-physical systems ("CPS") from abnormalities, such as cyber-attacks, in an automatic and vulnerability-driven manner. Embodiments provide a vulnerability module that is effective and efficient in finding cyber vulnerability (attack surface) of industrial assets (CPS). The vulnerability module may, in embodiments, automatically update attack detection models based on an identified vulnerability, thereby providing increased cyber protection for the asset. Embodiments may identify critical data values that are near a decision boundary, and embodiments may therefore confuse an attack detection model, and embodiments may then use these samples to further train the attack detection models. Embodiments may also provide for assessing the impact of a cyber-attack on the industrial asset.

With this and other advantages and features that will become hereinafter apparent, a more complete understanding of the nature of the invention can be obtained by referring to the following detailed description and to the drawings appended hereto.

Other embodiments are associated with systems and/or non-transitory computer-readable mediums storing instructions to perform any of the methods described herein.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As described above, an industrial asset (e.g., power turbines, electric motors, aircraft engines, locomotives, hydroelectric power plants) with critical infrastructure may be operated by an industrial control system. As a result, a key challenge with these industrial assets is preventing a cyber-attack on the industrial control system by identifying and addressing any vulnerabilities in the system. The cyber-attack may manipulate the system by changing sensor values, actuators (e.g., valves that affect the flow into a system), rotational speed, air flow, and/or by issuing false commands, etc. for the system. As some non-exhaustive examples, the cyber-attack may: 1. make the system less efficient by having an aircraft engine or gas turbine consume more fuel to make the same amount of power, or 2. trip the system so that the system shuts down, etc.

Figure 1:
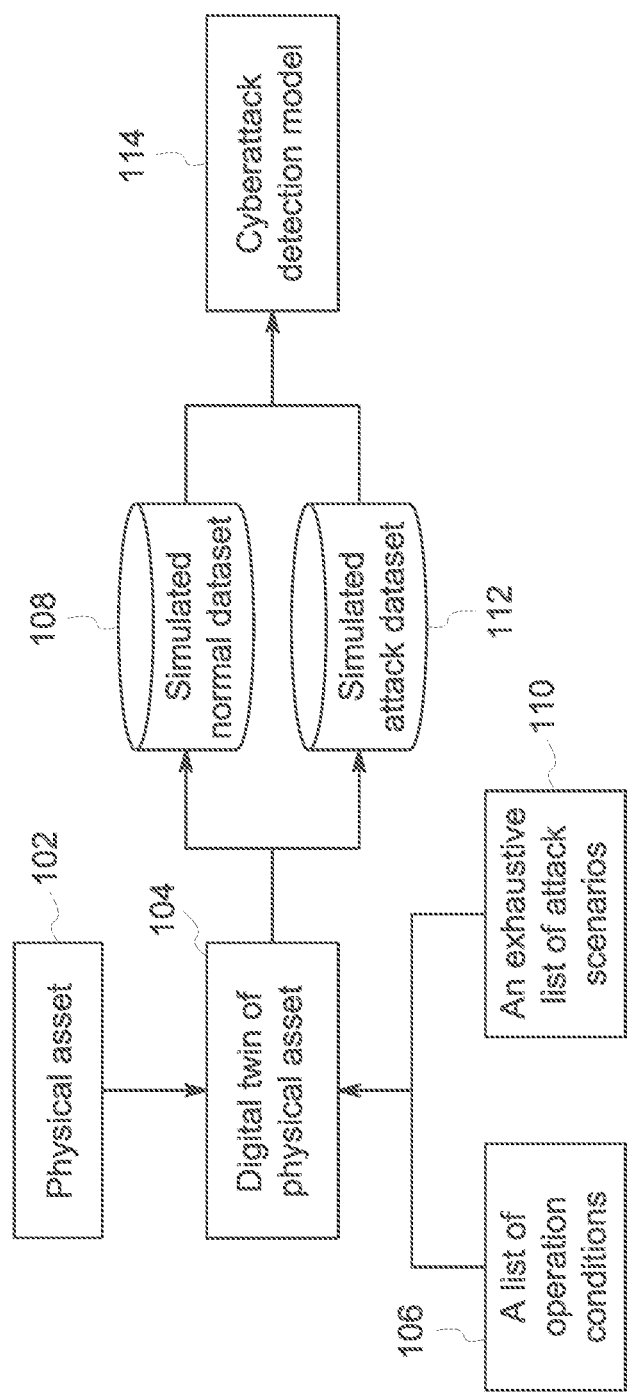
FIG. 1 is a high-level block diagram of a system.

Conventionally, these vulnerabilities are manually identified via discussion by a group of experts. As shown in FIG. 1A, a physical asset 102 may have a digital twin 104 of itself. The digital twin 104 may receive a list of operation conditions 106 as input, and when executed with the operation conditions, may output a simulated normal dataset 108. The digital twin 104 may also receive as input the exhaustive list of vulnerabilities/attack scenarios 110 identified by the group of experts. Execution of the digital twin 104 with the exhaustive list (via a brute force approach) of attack scenarios 110 (including all possible attack scenarios/attack vectors) as input may output a simulated attack dataset 112. Both the simulated normal dataset 108 and the simulated attack dataset 112 may be used to generate a detection model 114. However, exhaustively exploring all possible attack scenarios and simulating all of these attacks under all possible operation conditions may be very expensive computationally due to the large search space with infinite combinations of individual attack points (e.g., sensors, actuator, control parameters, etc.) and the fact that the digital twin model may take a long time to complete a run. Additionally, such an approach may be practically impossible (e.g., the group of experts may not think of all possible scenarios).

Embodiments may provide a machine-learning based vulnerability identification framework ("vulnerability module") that may identify the vulnerability and may continually update detection models simultaneously so that a more robust and accurate detection model is constantly being generated to prevent those vulnerabilities.

Figure 2A:
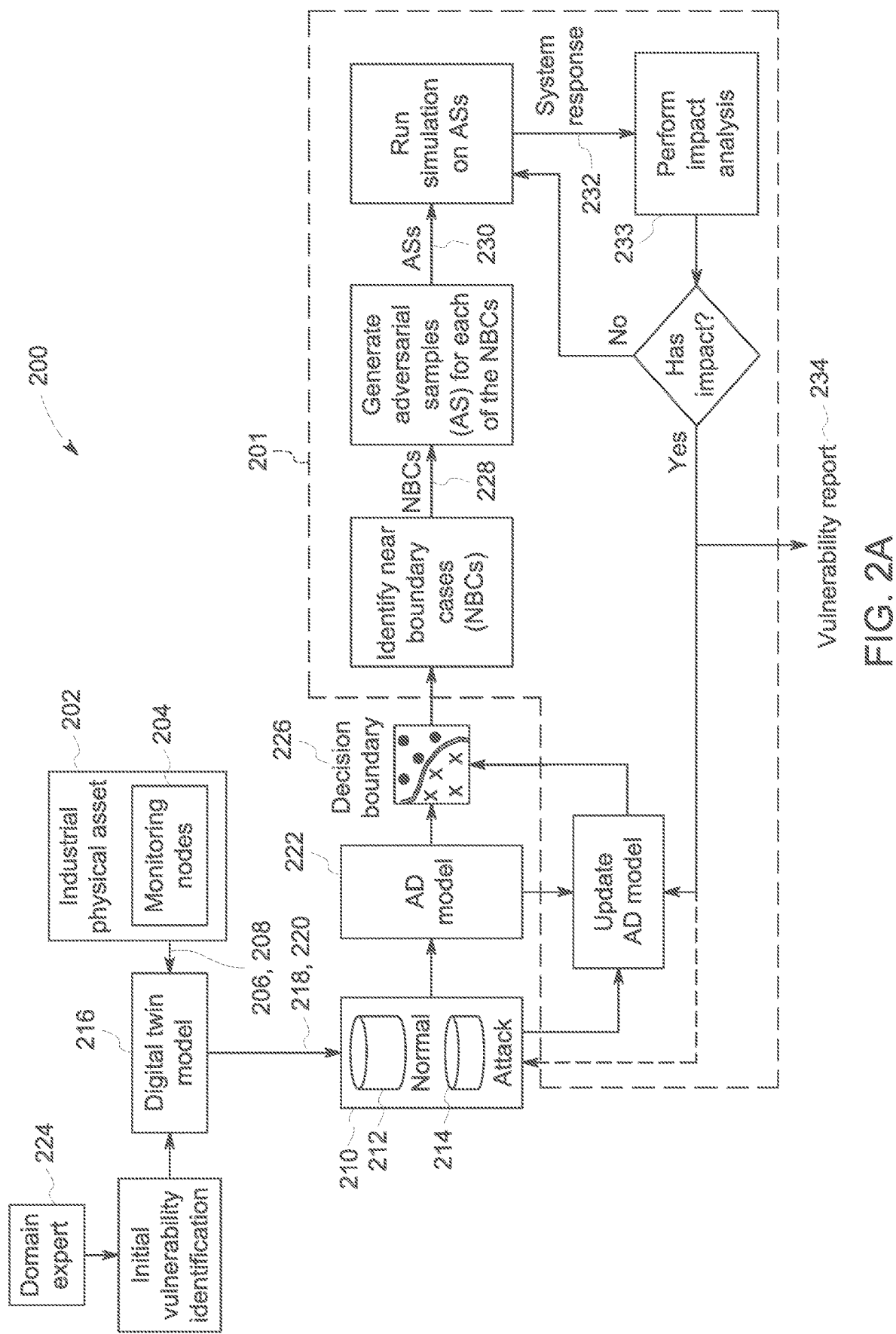
FIG. 2A is a high-level block diagram of a system that may be provided in accordance with some embodiments.
Figure 2B:
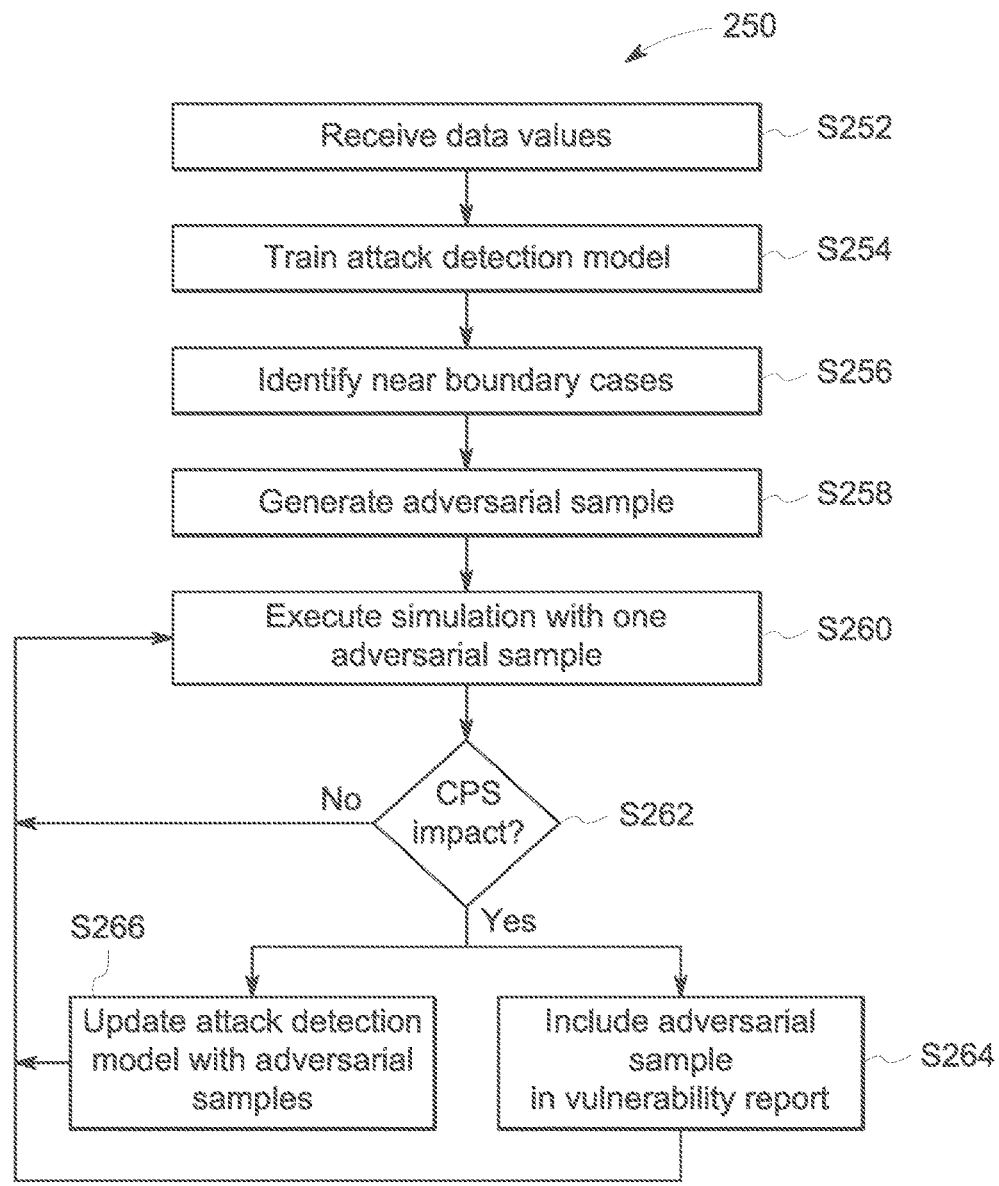
FIG. 2B is a method that may be provided in accordance with some embodiments.

FIGS. 2A and 2B are a high-level block diagram of a system 200 that may be provided in accordance with some embodiments and a process 250 in accordance with some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

The system 200 may include a cyber-physical system ("CPS") (e.g., industrial asset) 202 having monitoring nodes 204, such as sensors, actuators, controller parameters/gains, a component, a subsystem, etc. that generate a series of current monitoring node values 206 over time that represent a current operation of the CPS 202. These monitoring node values 206 may be further processed. The further processing may include, for example, filtering to address gaps in the data, bad data, outliers, etc., the filtering resulting in "clean" data; extracting/generating feature vectors 208 from the clean data via a feature extractor, as described further below. Note that generation of the feature vector may include processing via one of feature transforms, identity transforms, and feature-based dynamic models. According to some embodiments, at least one of the feature vectors is associated with principal components, statistical features, deep learning features, frequency domain features, time series analysis features, logical features, geographic or position-based locations, and/or interaction features.

The system 200 may also include a digital twin model 216 of the CPS 202. The digital twin model 216 may be a physics-based digital twin. The digital twin model 216 may provide for the exploration and identification of cyber vulnerability of the CPS. The digital twin model 216 may be of sufficient quality that it may at least predict the underlying physics and behavior of the CPS 202 (e.g., the digital twin may act in the same manner as the CPS). The digital twin model may use the physics of the system 202 to model both steady state behavior (the CPS operating at a constant (e.g., a car driving at 55 mph)) and transient behavior (the CPS having bursts of different operational states (e.g., a car driving and breaking)).

The system 200 may also include a vulnerability module 201. The vulnerability module 201 may start with identifying data (both normal and abnormal) samples that are close to a decision boundary, as described further below.

Initially, at S252, data values may be received from a data store 210. The data store 210 may include a normal data store 212 and an attack data store 214. The monitoring node values 206 and/or feature vectors 208 may be received by the digital twin model 216. In one or more embodiments, the digital twin model 216 of the CPS 202 may generate data values 218, based on simulation using the received monitoring node values 206 from monitoring nodes 204 and/or feature vectors 208, that may be received by the normal data store 212. Abnormal data 220 may be synthesized data of the digital twin model 216 and may be stored in the attack data store 214.

Figure 2C:
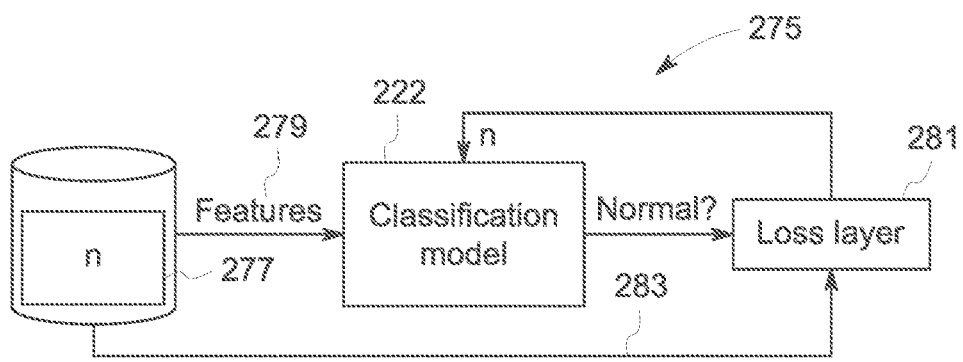
FIG. 2C is an example of a model that may be provided in accordance with some embodiments.

Then at S254 an attack detection model 222 is trained, whereby at the termination of training, the trained model may be a trained attack detection model. The trained attack detection model 222 may be any suitable model (e.g., neural network or non-neural network). In one or more embodiments, the attack detection model 222 may be developed using digital twin simulations of attack vectors designed by domain experts, as well as other values evaluated by domain experts. In one or more embodiments, the data values from the data store 210 may be used to train the initial attack detection model 222. The attack detection model 222 may be trained, as described further below with respect to FIG. 2C, to determine whether a data value is normal or abnormal. Initially, domain experts 224 may provide definitions as to what constitutes normal behavior and abnormal behavior, and these definitions are used to train the attack detection model such that the attack detection model knows which values are normal and which are abnormal/attack.

As described with respect to FIGS. 2C, 2D and 3 through 11, the attack detection model 222 may generate "abnormality" decisions based on feature vectors and decision boundaries 226. In particular, the attack detection model 222 may generate an anomaly status indicating if the cyber-physical system is experiencing "normal" or "abnormal" operation. According to some embodiments, the attack detection model 222 may further generate an anomaly score, with which an anomaly status can be determined by comparing the score with the pre-defined decision threshold. A score higher than the threshold indicates anomaly status and the higher values of the score indicates a greater likelihood of abnormality.

Figure 4:
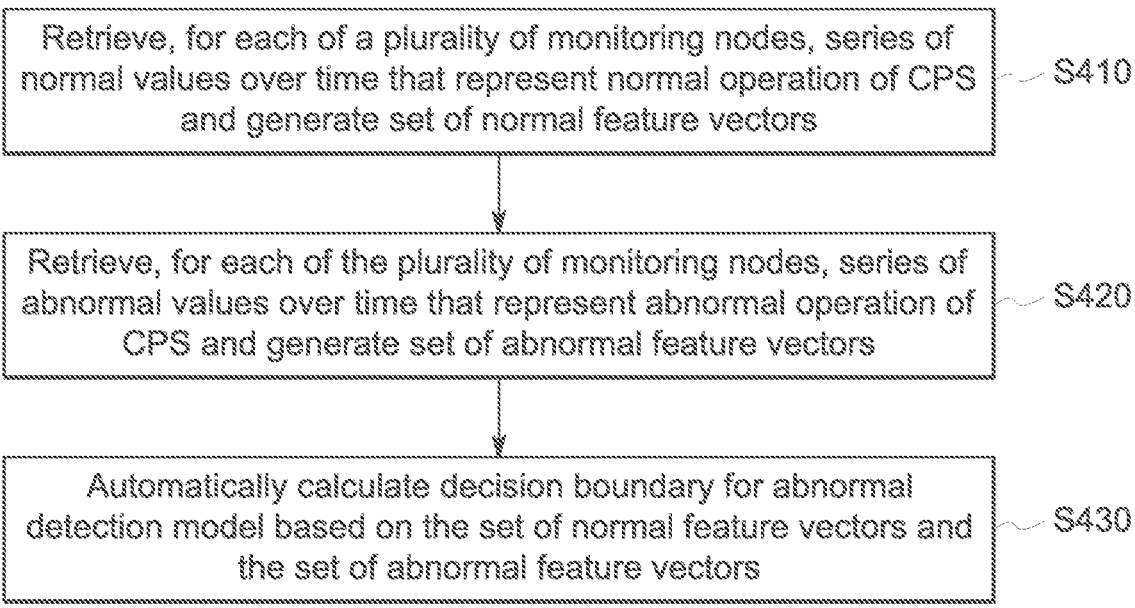
FIG. 4 is a model creation method according to some embodiments.

The attack detection model 222 may be trained via the data received from the digital twin and monitoring nodes, as well as domain experts 224 as described with respect to FIG. 4. The domain experts 224 may define normal operation conditions and attack scenarios. Then, simulation may be used to generate normal and attack data based on the defined normal operation conditions and attack scenarios. As used herein, a "domain expert" may be a person who is an authority in a particular area or topic; a person with special knowledge or skills in a particular area of endeavor; a person with a strong theoretical foundation in the specific field for which the data was collected. The domain expert 224 may understand how the physical asset/CPS 202 works and may know how to change the asset's behavior by modifying sensor measurements or actuator values, etc.

In one or more embodiments, each definition (normal or abnormal) provided by the domain experts 224 is considered ground truth data corresponding to a respective one of data values 277. In one or more embodiments, the various data sources may be locally stored or reside remote from a model creation computer. Moreover, various devices described herein might be combined according to embodiments of the present invention.

During training, a feature extractor extracts features 279 from each of the data values and uses those features to train the attack detection model 222. The term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc.

The type and number of features extracted from the data values may be optimized using domain-knowledge and/or a feature discovery process. Based on its initial configuration and design, the attack detection model ("classification model") 222 outputs a predicted classification (normal or abnormal) for the data value. Loss layer component 281 determines a loss by comparing the predicted classification generated based on a given input classification with the actual classification 283 associated with the data value 277. A loss is determined for each input data value 277 in order to determine a total loss. The loss may comprise an L1 loss, an L2 loss, or any other suitable measure of total loss known in the art.

The total loss is backpropagated from loss layer component 281 to the attack detection model 222. As is known in the art, the attack detection model 222 may have internal weights and these weights may be modified in response to the total loss. The foregoing process repeats until it is determined that the total loss has reached an acceptable level or training otherwise terminates.

At termination of the training, the trained attack detection model 222 may include information about a decision boundary 226 created via the supervised learning. The decision boundary may be a boundary that separates the input data values into particular categories (e.g., normal or abnormal). Thus, a decision boundary may be automatically calculated for a model using supervised learning. According to some embodiments, the decision boundary might be associated with a line, a hyperplane, a non-linear boundary separating one category from another category, and/or a plurality of decision boundaries. Moreover, a decision boundary might comprise a multi-class decision boundary separating multiple categories.

System 275 may comprise any system or systems for training the attack detection model that are or become known. For example, the training system may employ supervised learning, unsupervised learning and/or reinforcement learning. Generative adversarial networks may be used including a generative and a discriminative network as is known.

According to some embodiments, the trained attack detection model may implement a function. The function may be characterized as a set of parameter values associated with each node of the network. In one example, the function is represented by parameter values of kernels of a fully convolutional network. The function (e.g., embodied in parameter values of trained convolutional kernels) may be deployed as is know in the art to another system.

Turning back to the process 250, with the building of the attack detection model 222 based on identified attack/abnormal and normal data at S256, the vulnerability module 201 identifies one or more near boundary cases 228 in the data store 210. A near boundary case ("NBC") 228 is an output of the attack detection model 222 that is close to the decision boundary 226. A NBC 228 maybe a sample with the smallest distance to a neighbor sample on the opposite side of the decision boundary 226. It is noted that there may be a higher confidence in the classification of values that are far away from the decision boundary 226. For values closer to the decision boundary, the confidence value may decrease as there may be additional factors (e.g., noise, slightly different operating conditions, etc.) that may result in the erroneous classification of the data value. The vulnerability module 201 may use at least one of a plurality of processes to identify the NBCs 228. The inventors note there may be at least three types of processes to identify NBCs: 1. based on the detection model outputs; 2. based on the raw inputs/measurements to the detection model; and 3. based on features calculated from the raw inputs/measurements.

As a non-exhaustive example of the first type (based on the detection model outputs), in a case that the output of the attack detection model 222 is a probability, data values that are close to the decision boundary within some given range may be NBCs. For example, with probability, the attack detection model 222 output will be a probability of the data value being an attack. In this sort of binary classification problem, the probability may be in a range of zero (0) to one (1), with zero being 100% confident it is not an attack and one being 100% confident it is an attack, and the decision boundary at 0.5. If the attack detection model 222 output is 0.5 or around 0.5, this is a NBC because the model is the most unconfident in the classification. Continuing with this example, for a decision boundary of 0.5, any output between 0.4-0.6 may be a NBC. This range may be further narrowed to 0.45 or 0.455 to 0.55 or 0.555, or any other suitable range.

As yet another non-exhaustive example of the first type (based on the detection model outputs), the attack detection model 222 may be a support vector machine, in which case the support vectors on both sides of the decision boundary may be NBCs 228.

As a non-exhaustive example of the second type (based on the raw inputs/measurements of the detection model), the nearest neighbor sample may be calculated in raw inputs. For example, with respect to raw inputs, a value received by the attack detection model 222 from the data store 210 is compared to a threshold value to determine whether the raw value is a NBC. With respect to measurements, for example, for each point on a first side of the decision boundary, a distance is measured to each of the points on a second side of the decision boundary. Then the one or more sets of points (where each set is one point on the first side of the decision boundary and one point on the second side of the decision boundary) that have the shortest distance between them may be determined to be NBC.

With respect to the third type (based on features calculated from the raw inputs/measurements), this is similar to the second type, except instead of values received from the data store 210, the values being considered are feature values that have been calculated for the raw inputs/measurements. For example, if the raw value is temperature (which may be a time-series), a feature may be the mean value of the temperature.

Continuing with the process 200, after the vulnerability module 201 identifies the NBCs 228 in S256, the vulnerability module 201 may generate adversarial samples 230 at S258. In one or more embodiments, an adversarial sample 230 may be generated for each NBC 228 identified by the vulnerability module 201. An adversarial sample (x') 230 for an NBC 228 (x), may be the certain specific perturbation of x, that is, x'=x+perturbation, such that the detection decision on x' is different (opposite) from that on x, for example, it becomes one (1) (attack) while the detection decision on x is zero (0) (normal). This type of perturbation may be referred to as an analytical perturbation as it may be analytically determined using a method like fast gradient sign method (FGSM), or other suitable method. The perturbation may modify at least one input variable to the attack detection model to cause the output to have an opposite classification. For example, in a case a NBC has a "normal" classification, an input variable is modified such that the attack detection model 222 would have an output having an "attack/abnormal" classification. In one or more embodiments, it may be desirable to have a minimum change/perturbation.

Figure 2D:
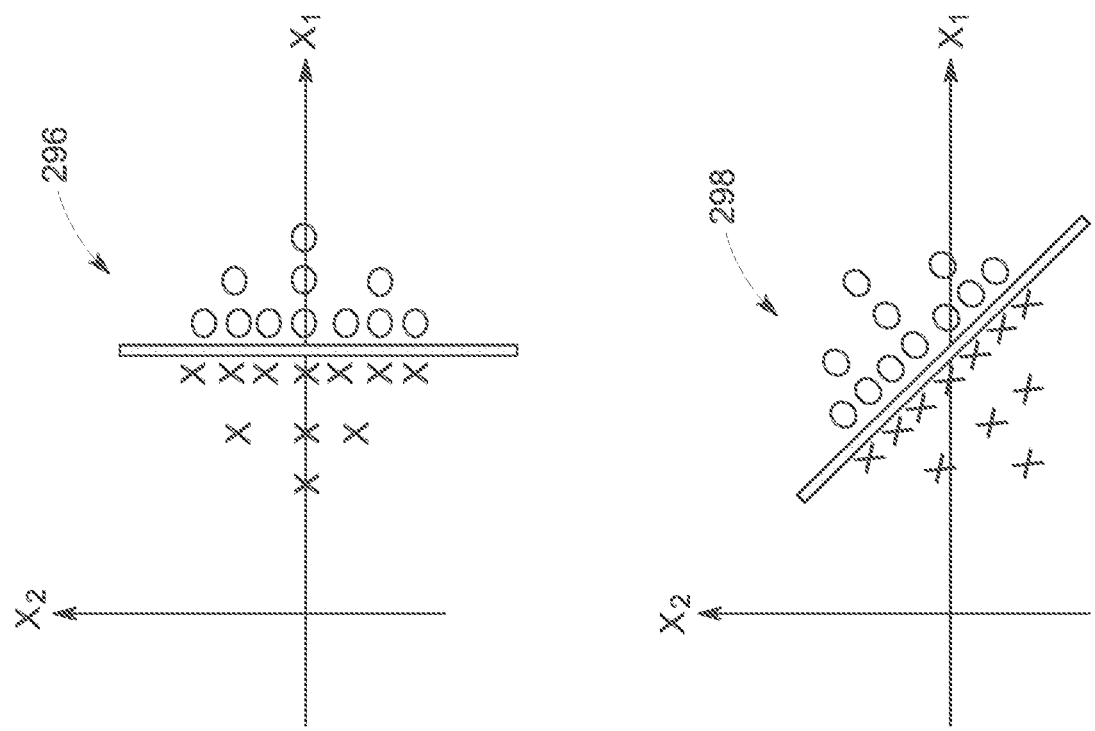
FIG. 2D is a diagram of decision boundaries in different dimensions in accordance with some embodiments.
Figure 2D:
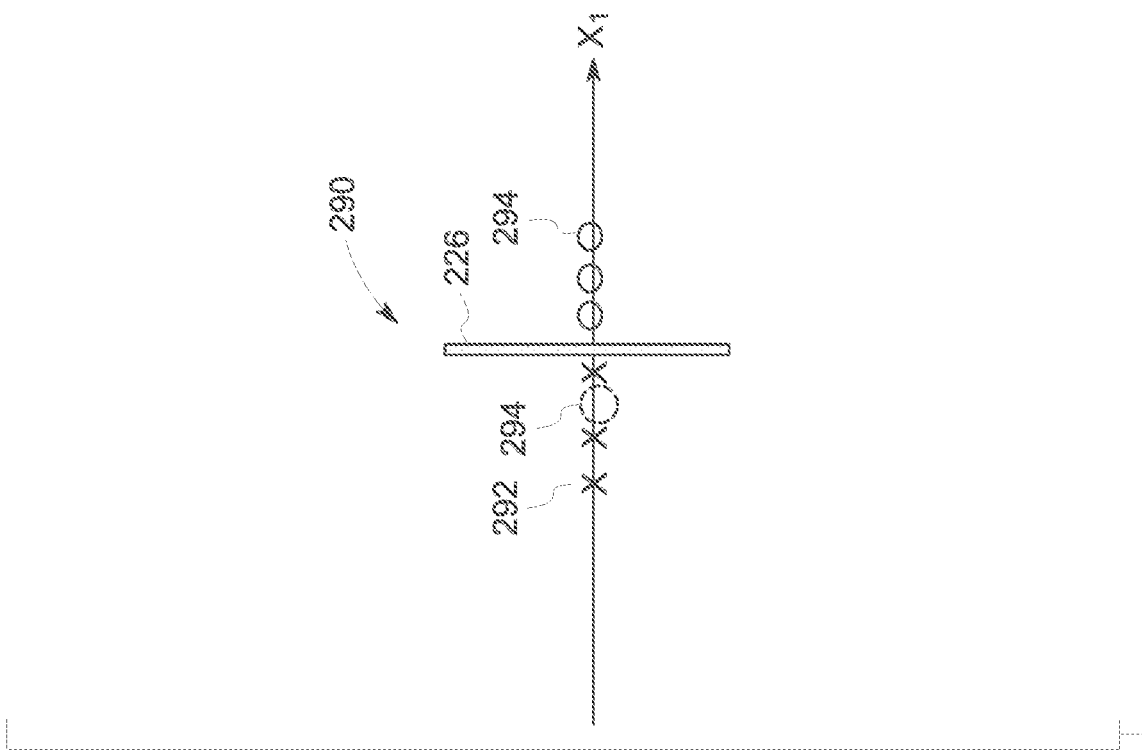

It is noted that while the use of NBCs identifies the most likely adversarial candidates that may cause the attack detection model to output an erroneous classification near the decision boundary, there may still be a challenge with respect to the "completeness" of the decision boundary. The inventors note, for example, that the decision boundary may be inadequate for separating all normal vs attack data values, particularly with respect to new cases in a higher dimensions. Often decision boundaries that represent normal vs abnormal values are in a very high dimensional space (e.g., 120 dimensions), and then this dimensional space may be collapsed by any suitable method to a lower dimensional space (1-, 2-, 3-dimensions) to facilitate visualization. However, the collapsing process may result in a loss of some separations, which in turn may result in some values being far from the decision boundary in a low dimensional space but close to the decision boundary in a higher dimensional space. For example, as shown in FIG. 2D for one dimensional space (a) 290, there may be normal samples 292 represented by "X" and, on the opposite side of the decision boundary 226, abnormal/attack samples 294 represented by "0". In this dimensional space, there may not be a clear separation of cases, for example, there may be an "0" (shown dotted) in the space between the "X"s. Further, with this additional "0" between the "X"s, the output may still be a mis-classification even if the decision boundary is moved. When the decision boundary is extended to a higher dimension (e.g., a two-dimensional space (b) 296 and (c) 298), the decision boundary may remain consistent ((b) 296) or may change ((c)298) to provide more separation between samples, such that the decision boundary may better separate the samples.

To that end, in one or more embodiments, when perturbations are executed to generate adversarial samples, a random perturbation process may be executed to generate more adversarial samples. The random perturbation process can be applied to one or more cases of NBCs 228, or applied to the adversarial samples generated by analytical perturbation.

In one or more embodiments the vulnerability module 201 may use at least one of random perturbation and analytical perturbation to generate adversarial samples 230. In a case that both random perturbation and analytical perturbation are used, the vulnerability module 201 may combine the adversarial samples from both perturbation types to run the simulation, as described below, or may further filter the samples in the combined set prior to running the simulation. In some embodiments, filtering may include identifying and eliminating redundant samples and/or samples that are too close to each other.

Any other suitable adversarial sample machine learning technique may be used to generate adversarial samples, including but not limited to fast gradient sign method, etc.

Next at S260, a simulation is executed with the digital twin model 216 using a first adversarial sample 230 as input to obtain a CPS response 232. In one or more embodiments, the digital twin model 216 may be executed with the adversarial sample 230 to determine at S262 whether the adversarial sample 230 has an impact on the CPS. The determination may be via impact analysis 233. Impact analysis 233 may be either observable (e.g., turbine trips or runbacks) or may be non-observable (e.g., turbine is running in an inefficient state). It is noted that observable impact may be more quickly/readily assessed than non-observable impact. In a case of observable impact, the digital twin may be executed with a normal condition and then with the new adversarial sample. A delta comparison is then made between the normal condition and the adversarial sample condition to determine whether the performance of the CPS has changed. If performance of the CPS did not change, the adversarial data did not have a negative impact. In a case of non-observable impact, for example, take the case of a turbine running in an inefficient state. The inefficient state may not be noticeable in that it may not affect the turbine's operation today, but after two months of operating in this manner, a part of the turbine may break as a result of this inefficient operation, resulting in a decrease in the life of the turbine. In embodiments, the output (negative or positive) of the impact analysis 233 may be determined by the vulnerability module 201. The vulnerability module 201 may make the determination based on a trained attack detection model and/or criteria provided by a domain expert. As described above, a "domain expert" may be a person who is an authority in a particular area or topic; a person with special knowledge or skills in a particular area of endeavor; a person with a strong theoretical foundation in the specific field for which the data was collected. They understand how the physical asset/CPS 202 works and know how to change the asset's behavior by modifying sensor measurements, actuator values, etc.

In a case it is determined at S262 the adversarial sample 230 has no impact on the CPS, the process returns to S260, and a next adversarial sample is used as input in the simulation executed by the digital twin model 216. In a case it is determined at S262 the adversarial sample has a negative impact on the CPS, the adversarial sample may be considered a vulnerability of the CPS, and the sample may be at least one of 1. included in a vulnerability report 234 at S264, 2. used to update the attack detection model 222 in S266, resulting in the generation of a new decision boundary 226 and 3. stored in the data store 210. The process then returns to S260 and is repeated for a next adversarial sample, as described above.

Figure 3:
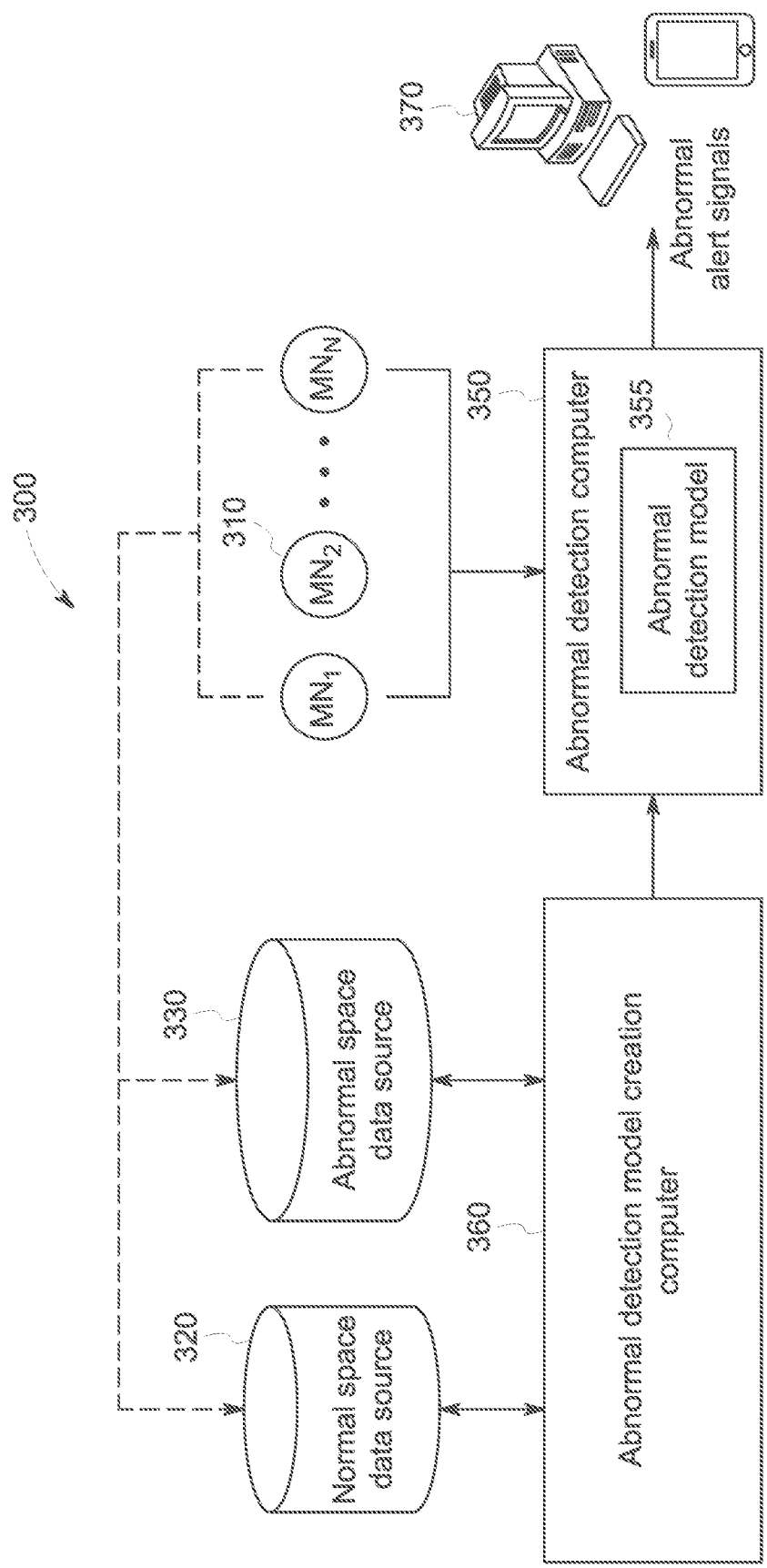
FIG. 3 is a high-level block diagram of a system that may be provided in accordance with some embodiments.

FIG. 3 is a high-level architecture of a system 300 in accordance with some embodiments. The system 300 may include monitoring node sensors 310 $MN_1$ through $MN_N$, a "normal space" data source 320, and an "abnormal space" data source 330. The normal space data source 320 might store, for each of the plurality of monitoring nodes 310, a series of normal values over time that represent normal operation of a cyber-physical system (e.g., generated by a model or collected from actual sensor data as illustrated by the dashed line in FIG. 3). The abnormal space data source 330 might store, for each of the monitoring nodes 310, a series of abnormal values that represent abnormal operation of the cyber-physical system (e.g., when the system is experiencing a cyber-attack or a fault).

Information from the normal space data source 320 and the abnormal space data source 330 may be provided to an abnormal detection model creation computer 360 that uses this data to create a decision boundary (that is, a boundary that separates normal behavior from threatened behavior). The decision boundary may then be used by an abnormal detection computer 350 executing an abnormal detection model 355. The abnormal detection model 355 may, for example, monitor streams of data from the monitoring nodes 310 comprising data from sensor nodes, actuator nodes, and/or any other critical monitoring nodes (e.g., sensor nodes $MN_1$ through $MN_N$) and automatically output global and local abnormal alert signal to one or more remote monitoring devices 370 when appropriate (e.g., for display to an operator). As used herein, the term "automatically" may refer to, for example, actions that can be performed with little or no human intervention. According to some embodiments, information about detected threats may be transmitted back to a cyber-physical system control system.

As used herein, devices, including those associated with the system 300 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The abnormal detection model creation computer 360 may store information into and/or retrieve information from various data stores, such as the normal space data source 320 and/or the abnormal space data source 330. The various data sources may be locally stored or reside remote from the abnormal detection model creation computer 360. Although a single abnormal detection model creation computer 360 is shown in FIG. 3, any number of such devices may be included. Moreover, various devices described herein might be combined according to embodiments of the present invention. For example, in some embodiments, the abnormal detection model creation computer 360 and one or more data sources 320, 330 might comprise a single apparatus. The abnormal detection model creation computer 360 functions may be performed by a constellation of networked apparatuses, in a distributed processing or cloud-based architecture.

A user, such as a domain expert, may access the system 300 via one of the monitoring devices 370 (e.g., a Personal Computer ("PC"), tablet, or smartphone) to select a process to train a model, view information about and/or manage threat information in accordance with any of the embodiments described herein. In some cases, an interactive graphical display interface may let a user define and/or adjust certain parameters (e.g., abnormal detection trigger levels) and/or provide or receive automatically generated recommendations or results from the abnormal detection model creation computer 360 and/or abnormal detection computer 350.

Thus. some embodiments described herein may use time series data from one or more monitoring nodes 310 from a physical (i.e., industrial or enterprise) asset and provide a reliable abnormality detection with low false positive rate. The system may extract features from the time series data for each monitoring node. The term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. The type and number of features for each monitoring node might be optimized using domain-knowledge and/or a feature discovery process. The features may be, for example, calculated over a sliding window with consecutive samples of specified duration from time series data. The length of the window and the duration of overlap for each batch may be determined from domain knowledge and an inspection of the data or using batch processing. Note that features may be computed at the local level (associated with each monitoring node) and the global level (associated with all the monitoring nodes, i.e., the whole asset). The time-domain values of the nodes or their extracted features may be, according to some embodiments, normalized for better numerical conditioning.

FIG. 4 illustrates a model creation method that might be performed by some or all of the elements of the system 300 described with respect to FIG. 3. At S410, the system may retrieve, for each of a plurality of monitoring nodes (e.g., sensor nodes, ac, controller nodes, etc.), a series of normal values over time that represent normal operation of the Cyber-Physical System ("CPS") and a set of normal feature vectors may be generated. Similarly, at S420 the system may retrieve, for each of the plurality of monitoring nodes, a series of abnormal (e.g., attacked) values over time that represent an abnormal operation of the cyber-physical system and a set of abnormal feature vectors may be generated. The series of normal and/or abnormal values might be obtained, for example, by running Design of Experiments ("DoE") on a cyber-physical system. At S430, a decision boundary may be automatically calculated for an abnormal detection model based on the set of normal feature vectors and the set of abnormal feature vectors. According to some embodiments, the decision boundary might be associated with a line, a hyperplane, a non-linear boundary separating normal space from threatened space, and/or a plurality of decision boundaries. Moreover, a decision boundary might comprise a multi-class decision boundary separating normal space, attacked space, and degraded operation space (e.g., when a sensor fault occurs). In addition, note that the abnormal detection model might be associated with the decision boundary, feature mapping functions, and/or feature parameters.

Figure 5:
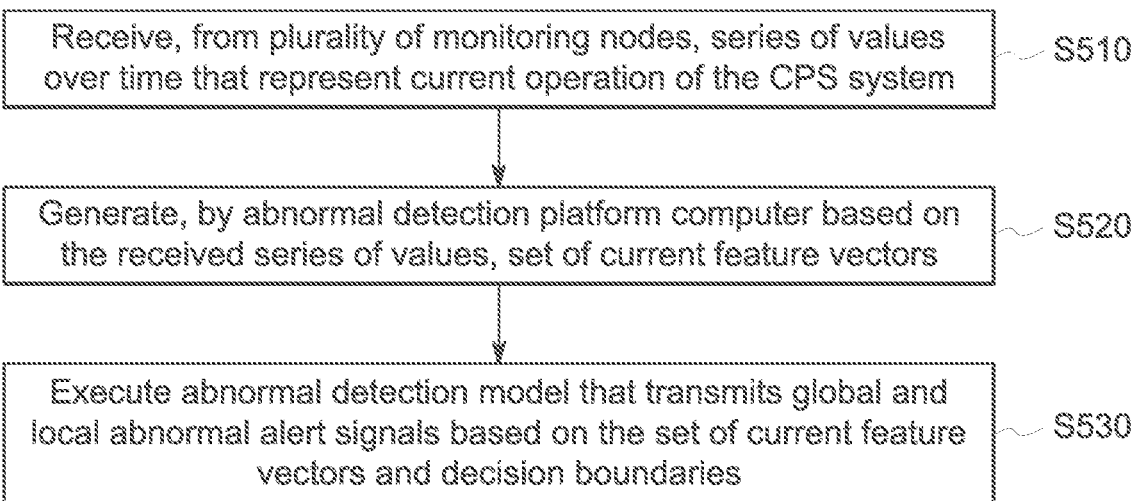
FIG. 5 is an abnormal alert method according to some embodiments.

The decision boundary can then be used to detect abnormal operation (e.g., as might occur during cyber-attacks). For example, FIG. 5 is an abnormal alert method according to some embodiments. At S510, the system may receive, from a plurality of monitoring nodes, a series of current values over time that represent a current operation of the cyber-physical system. At S520, an attack detection platform computer may then generate, based on the received series of current values, a set of current feature vectors. At S530, an abnormal detection model may be executed to transmit an abnormal alert signal based on the set of current feature vectors and a decision boundary when appropriate (e.g., when a cyber-attack is detected). According to some embodiments, one or more response actions may be performed when an abnormal alert signal is transmitted. For example, the system might automatically shut down all or a portion of the cyber-physical system (e.g., to let the detected potential cyber-attack be further investigated). As other examples, one or more parameters might be automatically modified, a software application might be automatically triggered to capture data and/or isolate possible causes, etc.

In some embodiments, another response action when the abnormal alert signal is transmitted may be including the abnormal signal into the data store 210 for detection model updating S266 of FIG. 2B.

Some embodiments described herein may take advantage of the physics of a control system by learning a priori from tuned high-fidelity equipment models (digital twin) and/or actual "on the job" data to detect single or multiple simultaneous adversarial threats to the system. Moreover, according to some embodiments, all monitoring node data may be converted to features using advanced feature-based methods, and the real-time operation of the control system may be monitored in substantially real-time. Abnormalities may be detected by classifying the monitored data as being "normal" or disrupted (or degraded). This decision boundary may be constructed using dynamic models and may help enable early detection of vulnerabilities (and potentially avert catastrophic failures) allowing an operator to restore the control system to normal operation in a timely fashion.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with DoE techniques. Moreover, multiple algorithmic methods (e.g., support vector machines or machine learning techniques) may be used to generate decision boundaries. Since boundaries may be driven by measured data (or data generated from high-fidelity models), defined boundary margins may help to create an abnormal zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account on operator's knowledge about system operation (e.g., the differences between normal and abnormal operation).

Figure 6:
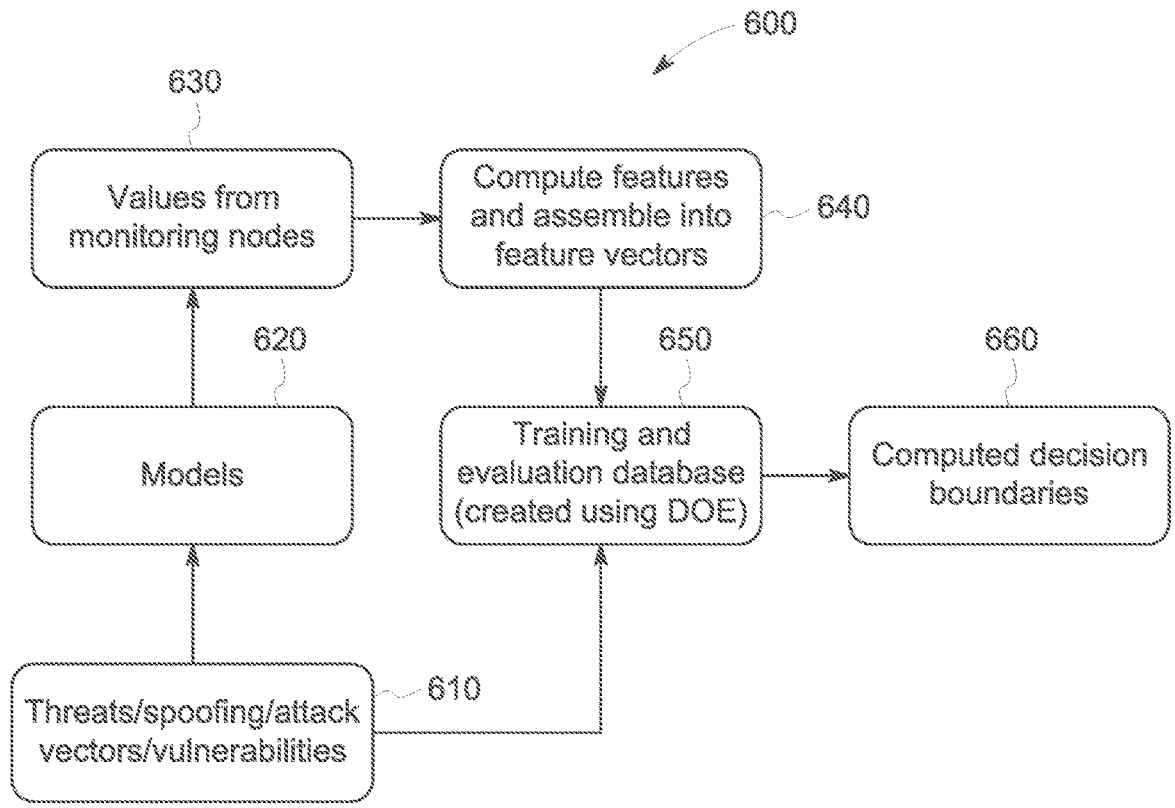
FIG. 6 illustrates an off-line process in accordance with some embodiments.

FIG. 6 illustrates an off-line boundary creation process 600 in accordance with some embodiments. Information about threats, spoofing, attack vectors, vulnerabilities, etc. 610 may be provided to models 620 and/or a training and evaluation database 650 created using DoE techniques. The models 620 may, for example, simulate data 630 from monitoring nodes to be used to compute features that are assembled into a feature vector 640 to be stored in the training and evaluation database 650. The data in the training and evaluation database 650 may then be used to compute decision boundaries 660 to distinguish between normal operation and abnormal operation. According to some embodiments, the process 600 may include a prioritization of monitoring nodes and anticipated attack vectors to form one or more data sets to develop decision boundaries. Attack vectors are abnormal values at critical inputs where malicious attacks can be created at the domain level that will make the system go into threatened/abnormal space. In addition, the models 620 may comprise high-fidelity models that can be used to create a data set (e.g., a set that describes threat space as "levels of threat conditions in the system versus quantities from the monitoring nodes"). The data 630 from the monitoring nodes might be, for example, quantities that are captured for a length of from 60 to 80 seconds from sensor nodes, actuator nodes, and/or controller nodes (and a similar data set may be obtained for "levels of normal operating conditions in the system versus quantities from the monitoring nodes"). This process will result in data sets for "abnormal space" and "normal space." The 60 to 80 seconds long quantities may be used to compute features 640 using feature engineering to create feature vectors. These feature vectors can then be used to obtain a decision boundary that separates the data sets for abnormal space and normal space (used to detect an anomaly such as a cyber-attack).

Since attacks might be multi-prong (e.g., multiple attacks might happen at once), DoE experiments may be designed to capture the attack space (e.g., using full factorial, Taguchi screening, central composite, and/or Box-Behnken). When models are not available, these DoE methods can also be used to collect data from real-world asset control system. Experiments may run, for example, using different combinations of simultaneous attacks. Similar experiments may be run to create a data set for the normal operating space. According to some embodiments, the system may detect "degraded" or faulty operation as opposed to a threat or attack. Such decisions may require the use of a data set for a degraded and/or faulty operating space.

Figure 7:
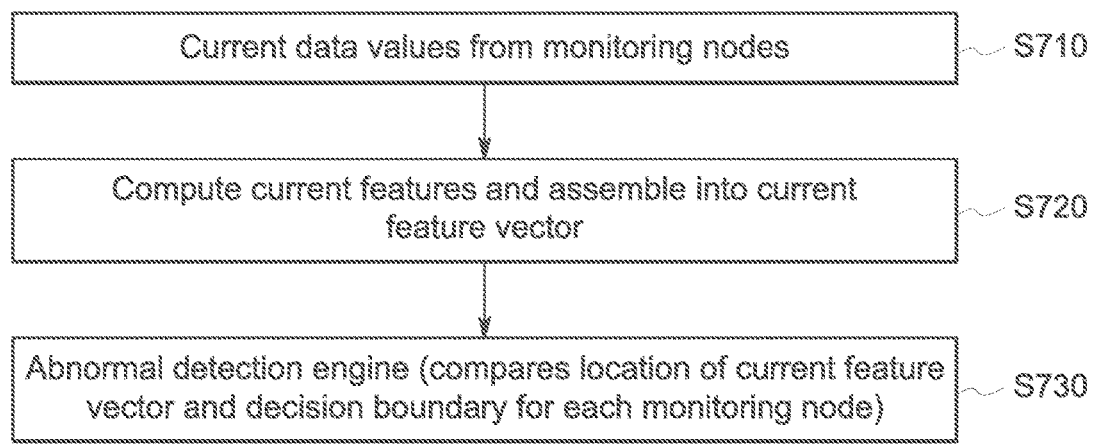
FIG. 7 illustrates a real-time process according to some embodiments.

FIG. 7 illustrates a real-time process to protect a cyber-physical system according to some embodiments. At S710, current data from monitoring nodes may be gathered (e.g., in batches of from 60 to 80 seconds). At S720, the system may compute features and form feature vectors. For example, the system might use weights from a principal component analysis as features. At S730, an abnormal detection engine may compare location of feature vectors to a decision boundary to make a determination (and output an abnormal signal if necessary). According to some embodiments, monitoring node data from models (or from real systems) may be expressed in terms of features since features are a high-level representation of domain knowledge and can be intuitively explained. Moreover, embodiments may handle multiple features represented as vectors and interactions between multiple sensed quantities might be expressed in terms of "interaction features."

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple monitoring nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Figure 8:
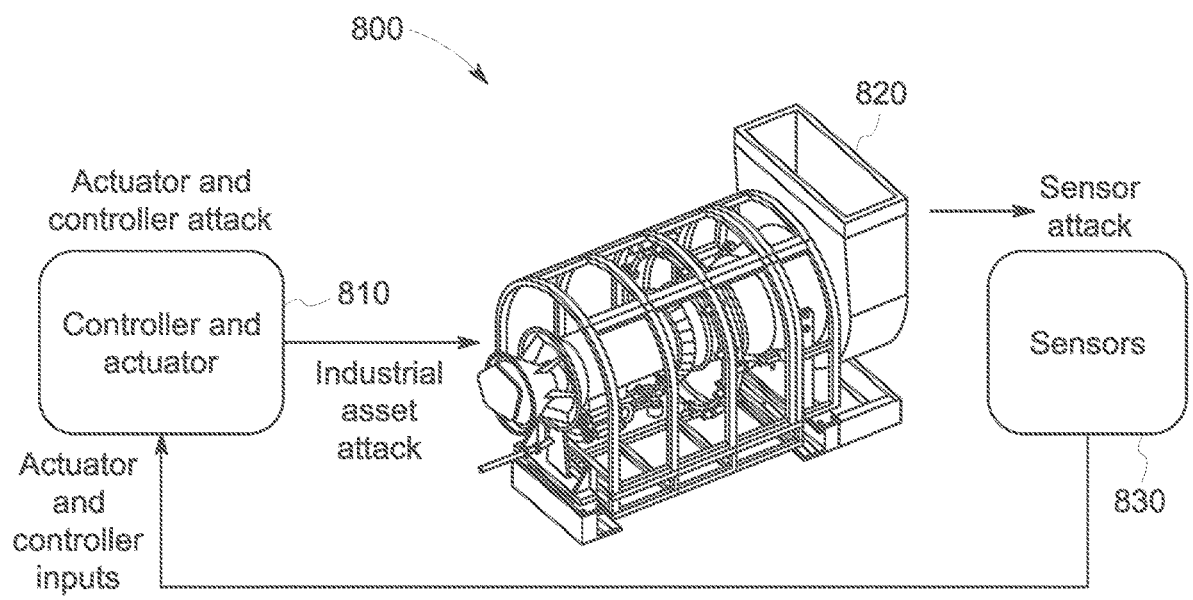
FIG. 8 is an example associated with a cyber-physical system engine in accordance with some embodiments.

FIG. 8 is an example 800 associated with a cyber-physical system in accordance with some embodiments. In particular, the example includes a controller and actuator portion 810 subject to actuator and controller attacks, a gas turbine portion 820 subject to state attacks, and sensors 830 subject to sensor attacks. By way of examples only, the sensors 830 might comprise physical and/or virtual sensors associated with temperatures, airflows, power levels, etc. The actuators might be associated with, for example, motors. By monitoring the information in the cyber-physical system, a threat detection platform may be able to detect cyber-attacks (e.g., using feature vectors and a decision boundary) that could potentially cause a large amount of damage.

Figure 9:
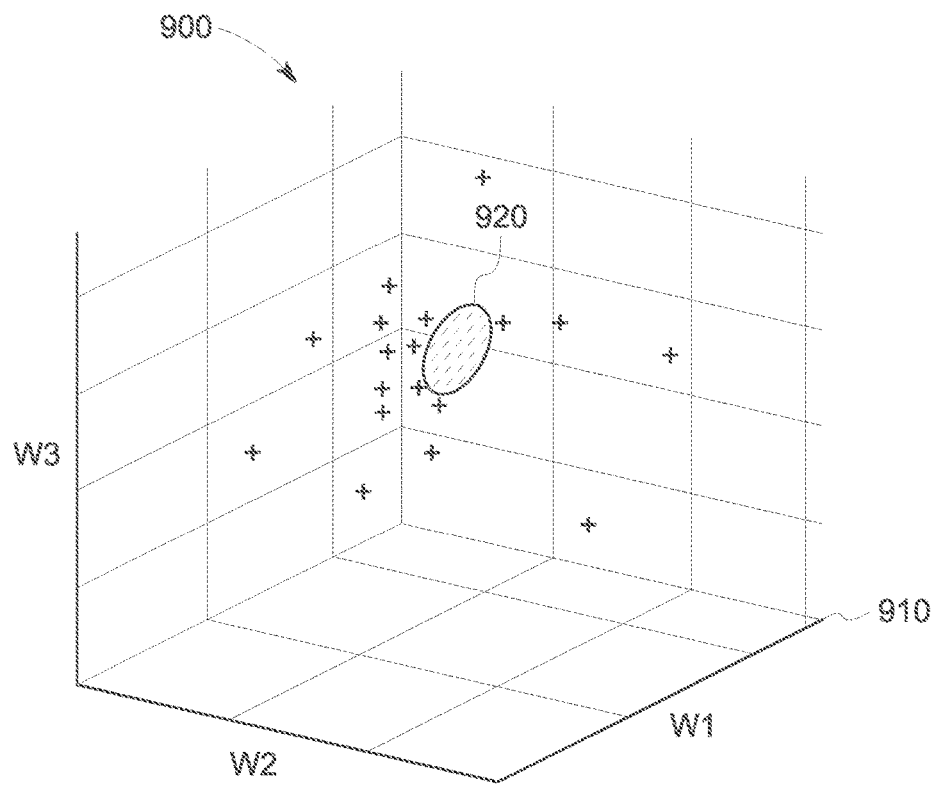
FIG. 9 illustrates three dimensions of sensor outputs in accordance with some embodiments.
Figure 10:
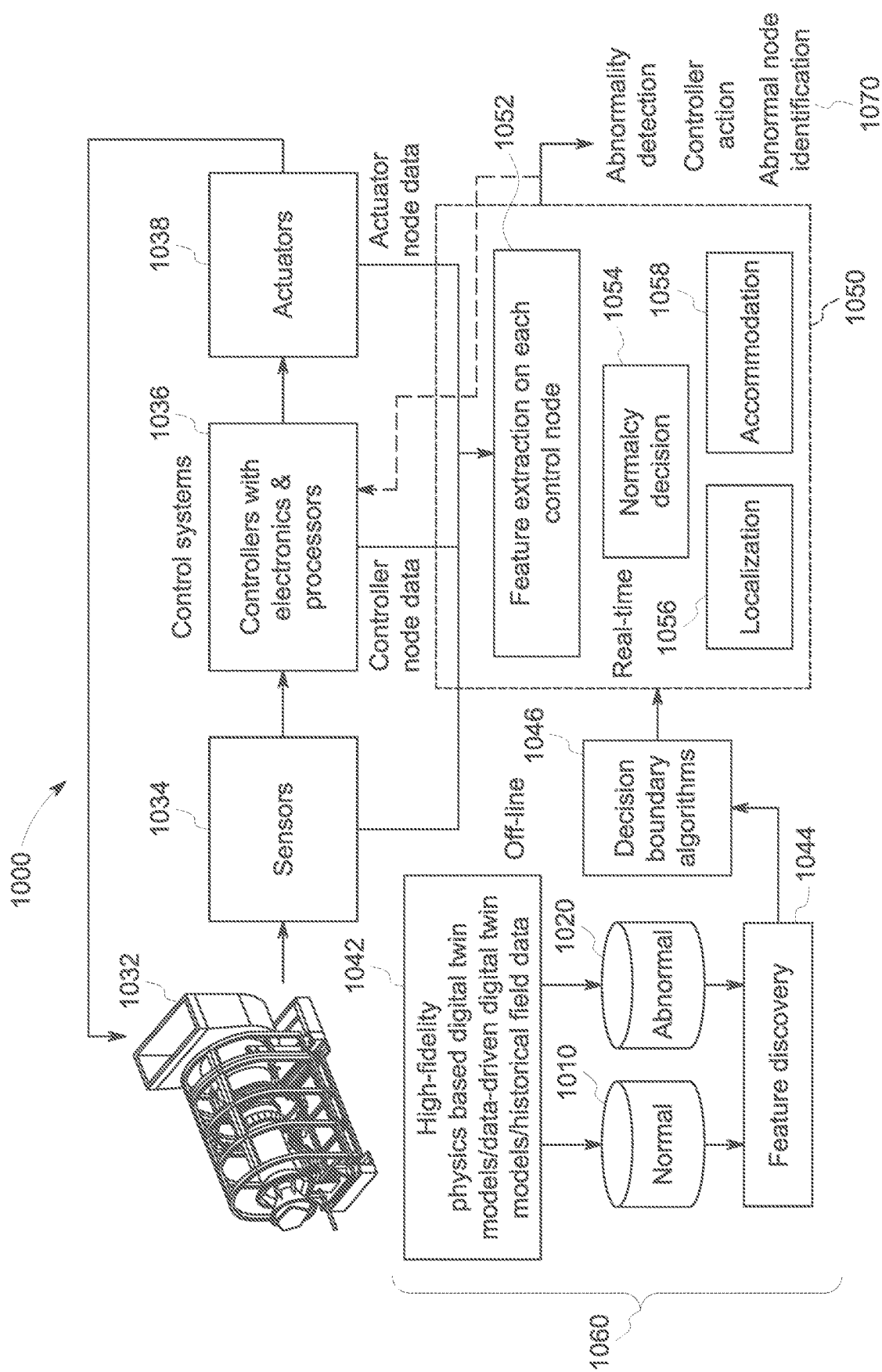
FIG. 10 is an abnormal alert system according to some embodiments.

FIG. 9 illustrates 900 three dimensions of monitoring node outputs in accordance with some embodiments. In particular, a graph 910 plots monitoring node outputs ("+") in three dimensions, such as dimensions associated with Principal Component Features ("PCF"): w1, w2, and w3. Moreover, the graph 910 includes an indication of a normal operating space decision boundary 920. Although a single contiguous boundary 920 is illustrated in FIG. 9, embodiments might be associated with multiple regions. Note that PCF information may be represented as weights in reduced dimensions. For example, data from each monitoring node may be converted to low dimensional features (e.g., weights). According to some embodiments, monitoring node data is normalized as follows:

$$S_{normalized}(k) = \frac{S_{nominal}(k) - S_{original}(k)}{\overline{S}_{nominal}}$$

where S stands for a monitoring node quantity at "k" instant of time. Moreover, output may then be expressed as a weighted linear combination of basis functions as follows:

$$S = S_0 + \sum_{j=1}^{N} w_j \Psi_j$$

where $S_0$ is the average monitoring node output with all threats, $w_j$ is the $j^{th}$ weight, and $\Psi_j$ is the $j^{th}$ basis vector. According to some embodiments, natural basis vectors are obtained using a covariance of the monitoring nodes' data matrix. Once the basis vectors are known, weight may be found using the following equation (assuming that the basis sets are orthogonal):

$$w_j = (S - S_0)^T \Psi_j$$

Note that weights may be an example of features used in a feature vector.

Thus, embodiments may enable the passive detection of indications of multi-class abnormal operations using real-time signals from monitoring nodes. Moreover, the detection framework may allow for the development of tools that facilitate proliferation of the invention to various systems (e.g., turbines) in multiple geolocations. According to some embodiments, distributed detection systems enabled by this technology (across multiple types of equipment and systems) will allow for the collection of coordinated data to help detect multi-prong attacks. Note that the feature-based approaches described herein may allow for extended feature vectors and/or incorporate new features into existing vectors as new learnings and alternate sources of data become available. As a result, embodiments may detect a relatively wide range of cyber-threats (e.g., stealth, replay, covert, injection attacks, etc.) as the systems learn more about their characteristics. Embodiments may also reduce false positive rates as systems incorporate useful key new features and remove ones that are redundant or less important. Note that the detection systems described herein may provide early warning to cyber-physical system operators so that an attack may be thwarted (or the effects of the attack may be blunted), reducing damage to equipment.

A cyber-attack detection and localization algorithm may process a real-time cyber-physical system signal data stream and then compute features (multiple identifiers) which can then be compared to the signal-specific decision boundary. A block diagram of a system 1000 utilizing a signal-specific cyber-physical system abnormality detection and localization algorithm according to some embodiments is provided in FIG. 10. In particular, a gas turbine 1032 provides information to sensors 1034 which helps controllers with electronics and processors 1036 adjust actuators 1038. A threat detection system 1060 may include one or more high-fidelity physics-based digital-twin models/data-driven digital twin models/historical field data 1042 associated with the turbine 1032 to create normal data 1010 and/or abnormal data 1020. The normal data 1010 and abnormal data 1020 may be accessed by a feature discovery component 1044 and processed by decision boundary algorithms 1046 while off-line (e.g., not necessarily while the gas turbine 1032 is operating). The decision boundary algorithms 1046 may generate an abnormal model including decision boundaries for various monitoring nodes. Each decision boundary may separate two data sets in a high dimensional space which is constructed by running a binary classification algorithm, such as a support vector machine using the normal data 1010 and abnormal data 1020 for each monitoring node signal (e.g., from the sensors 1034, controllers 1036, and/or the actuators 1038).

A real-time threat detection platform 1050 may receive the boundaries along with streams of data from the monitoring nodes. The platform 1050 may include a feature extraction on each monitoring node element 1052 and a normalcy decision 1054 with an algorithm to detect attacks in individual signals using signal specific decision boundaries, as well rationalize attacks on multiple signals, to declare which signals were attacked (or are otherwise abnormal), and which became anomalous due to a previous attack on the system via a localization module 1056. An accommodation element 1058 may generate outputs 1070, such as an anomaly decision indication (e.g., an abnormal) alert signal), a controller action, and/or a list of abnormal monitoring nodes.

During real-time detection, contiguous batches of control signal data may be processed by the platform 1050, normalized and the feature vector extracted. The location of the vector for each signal in high-dimensional feature space may then be compared to a corresponding decision boundary. If it falls within the abnormal region, then a cyber-attack may be declared. The algorithm may then make a decision about where the attack originally occurred. An attack may sometimes be on the actuators 1038 and then manifested in the sensor 1034 data. Attack assessments might be performed in a post decision module (e.g., the localization element 1056) to isolate whether the attack is related to the sensor, controller, or actuator (e.g., indicating which part of the monitoring node). This may be done by individually monitoring, overtime, the location of the feature vector with respect to the hard decision boundary. For example, when a sensor 1034 is spoofed, the attacked sensor feature vector will cross the hard decision boundary earlier than the rest of the vectors as described with respect to FIGS. 11 through 13. If a sensor 1034 is declared to be anomalous, and a command to the auxiliary equipment is later determined to be anomalous, it may be determined that the original attack, such as signal spoofing, occurred on the sensor 1034. Conversely, if the signal to the auxiliary equipment was determined to be anomalous first, and then later manifested in the sensor 1034 feedback signal, it may be determined that the signal to the equipment was initially attacked.

Figure 11:
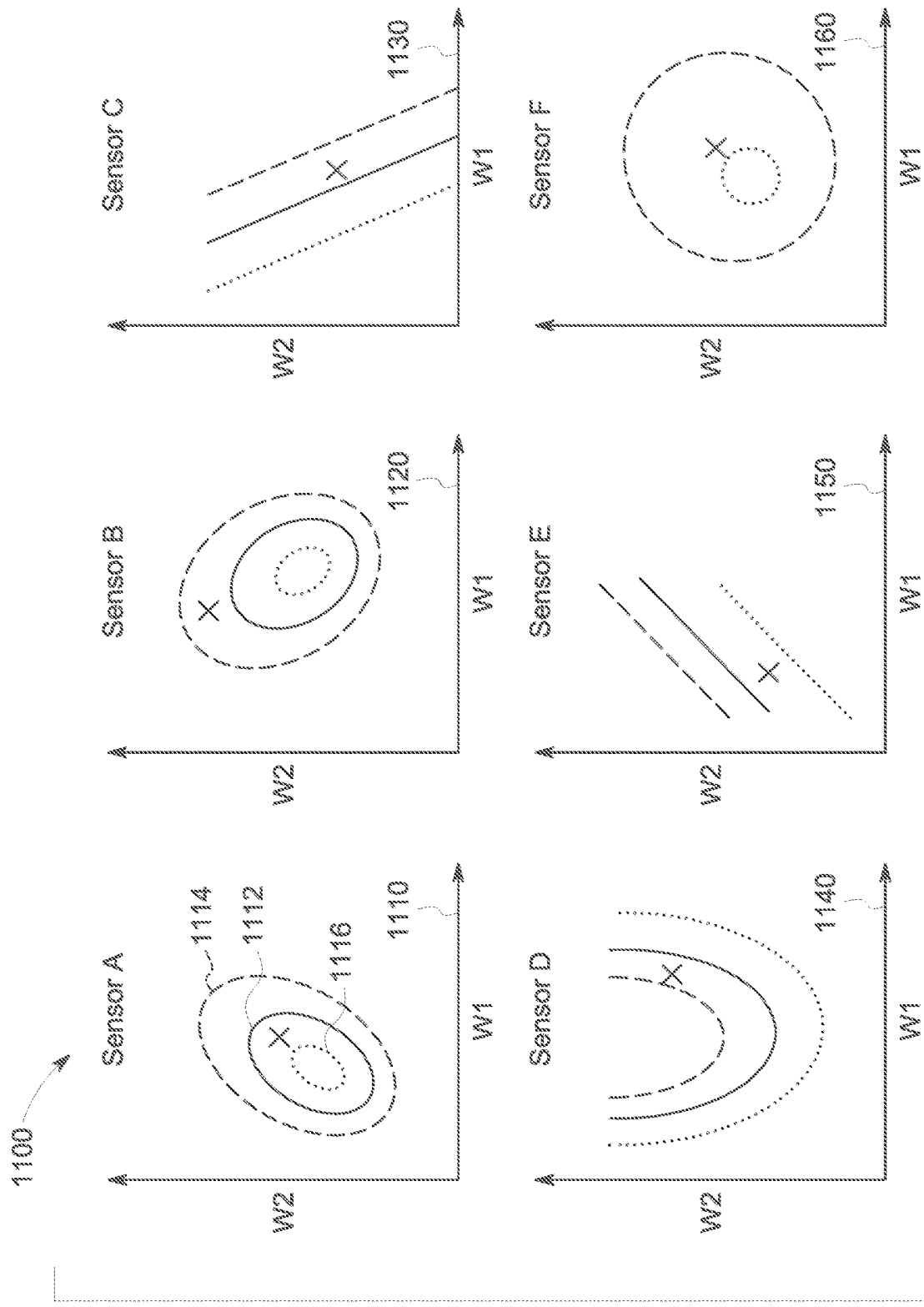
FIGS. 11 through 12 illustrate boundaries and locations of feature vectors for various parameters in accordance with some embodiments.
Figure 12:
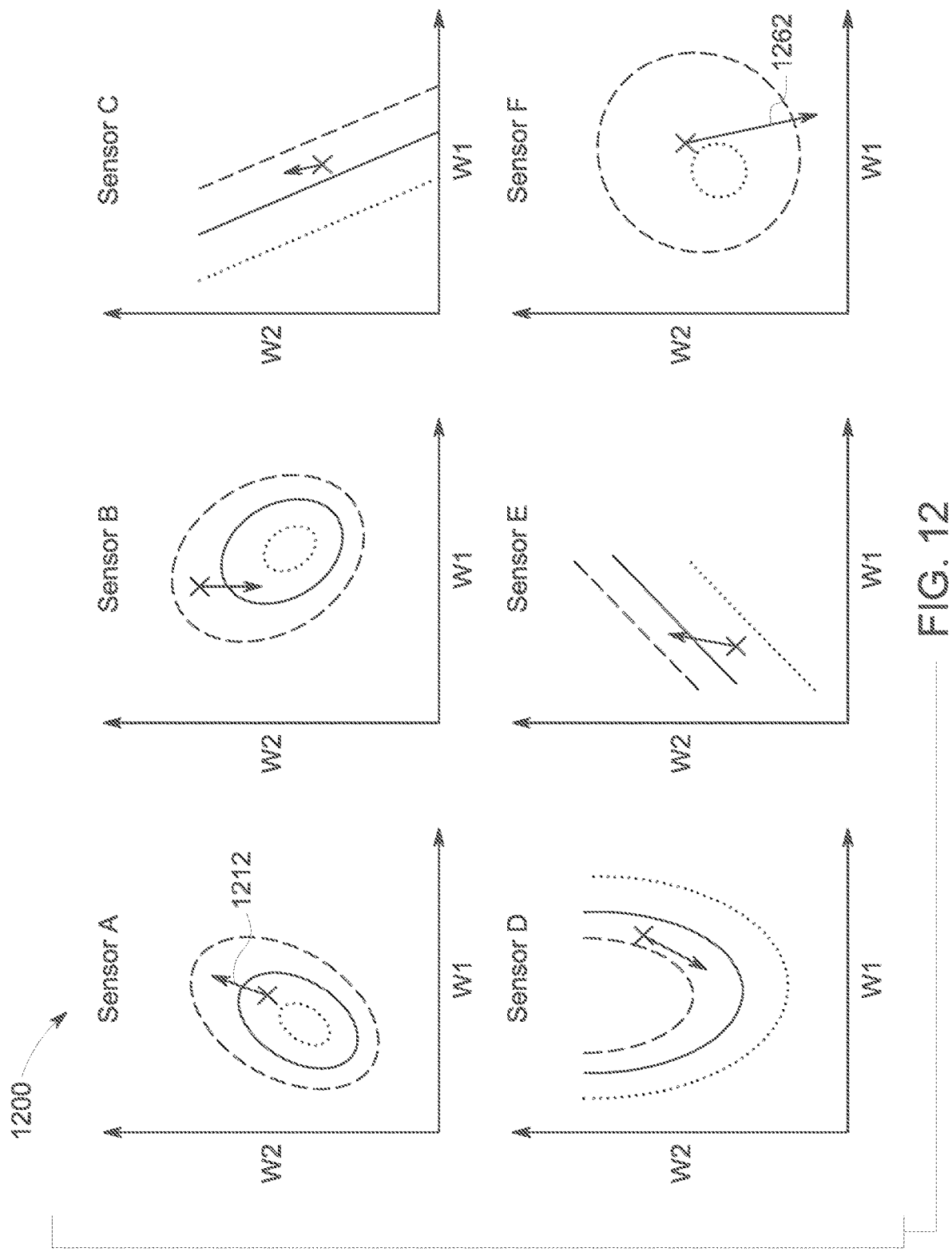

FIG. 11 illustrates 1100 boundaries and feature vectors for various monitoring node parameters in accordance with some embodiments. It is noted that the graphs in FIGS. 11 and 12 are non-exhaustive examples that do represent an actual asset's behavior. In particular, for each parameter a graph includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") that is performed on the input data. PCA might be one of the features that might be used by the algorithm to characterize the data, but note that other features could be leveraged.

A graph is provided for Sensor A 1110, Sensor B 1120, Sensor C 1130, Sensor D 1140, Sensor E 1150, and Sensor F 1160. Each graph includes a hard boundary 1112 (solid curve), inner boundary 1116 (dotted curve), and outer boundary 1114 (dashed curve) and an indication associated with current feature location for each monitoring node parameter (illustrated with an "X" on the graphs). As illustrated in FIG. 11, the current monitoring node location is between the minimum and maximum boundaries (that is, the "X" is between the dotted and dashed lines). As a result, the system may determine that the operation of the cyber-physical system control system is normal (and no threat is being detected indicating that the system is currently under attack or that a naturally occurring fault has occurred).

FIG. 12 illustrates 1200 subsequent boundaries and feature vectors for these parameters. Consider, for example, a feature vector movement 1212 for Sensor A. Even though feature vector 1212 has moved, it is still within the maximum and minimum boundaries and, as a result, normal operation of that monitoring node may be determined. This is the case for the first five graphs in FIG. 12. In this example, a feature vector movement 1262 for Sensor F has exceeded with maximum boundary and, as a result, abnormal operation of that monitoring node may be determined. The result is that the feature for the intermediary monitoring node signal feature vector illustrated in FIG. 12 moves 1262 such that it is anomalous. The algorithm detects this cyber-attack, and two parallel actions might be initiated. One action may be post processing of the signal to discover what was attacked, as a non-exhaustive example, if the system has been monitoring each exhaust thermocouple, it may conclude that none of them are currently abnormal. Therefore, it may be determined that something used to calculate this feature was attacked. The other action may be to continually monitor and detect additional attacks. Such an approach may facilitate a detection of multiple signal attacks.

Some embodiments described herein may take advantage of the physics of a cyber-physical system by learning a priori from tuned high-fidelity equipment models and/or actual "on the job" data to detect single or multiple simultaneous adversarial threats to the system. Moreover, according to some embodiments, all monitoring node data may be converted to features using advanced feature-based methods, and the real-time operation of the cyber-physical system may be monitored in substantially real-time. Abnormalities may be detected by classifying the monitored data as being "normal" or disrupted (or degraded). This decision boundary may be constructed using dynamic models and may help to enable early detection of vulnerabilities (and potentially avert catastrophic failures) allowing an operator to restore the cyber-physical system to normal operation in a timely fashion.

Thus, some embodiments may provide an advanced anomaly detection algorithm to detect cyber-attacks on, for example, key cyber-physical system control sensors. The algorithm may identify which signals(s) are being attacked using control signal-specific decision boundaries and may inform a cyber-physical system to take accommodative actions. In particular, a detection and localization algorithm might detect whether a sensor, auxiliary equipment input signal, control intermediary parameter, or control logical are in a normal or anomalous state. Some examples of cyber-physical system monitoring nodes that might be analyzed include: critical control sensors; control system intermediary parameters; auxiliary equipment input signals; and/or logical commands to controller.

A cyber-attack detection and localization algorithm may process a real-time cyber-physical system signal data stream and then compute features (multiple identifiers) which can then be compared to the sensor specific decision boundary. In some embodiments, generating features may involve simply performing an identity transform. That is, the original signal might be used as it is.

Figure 13:
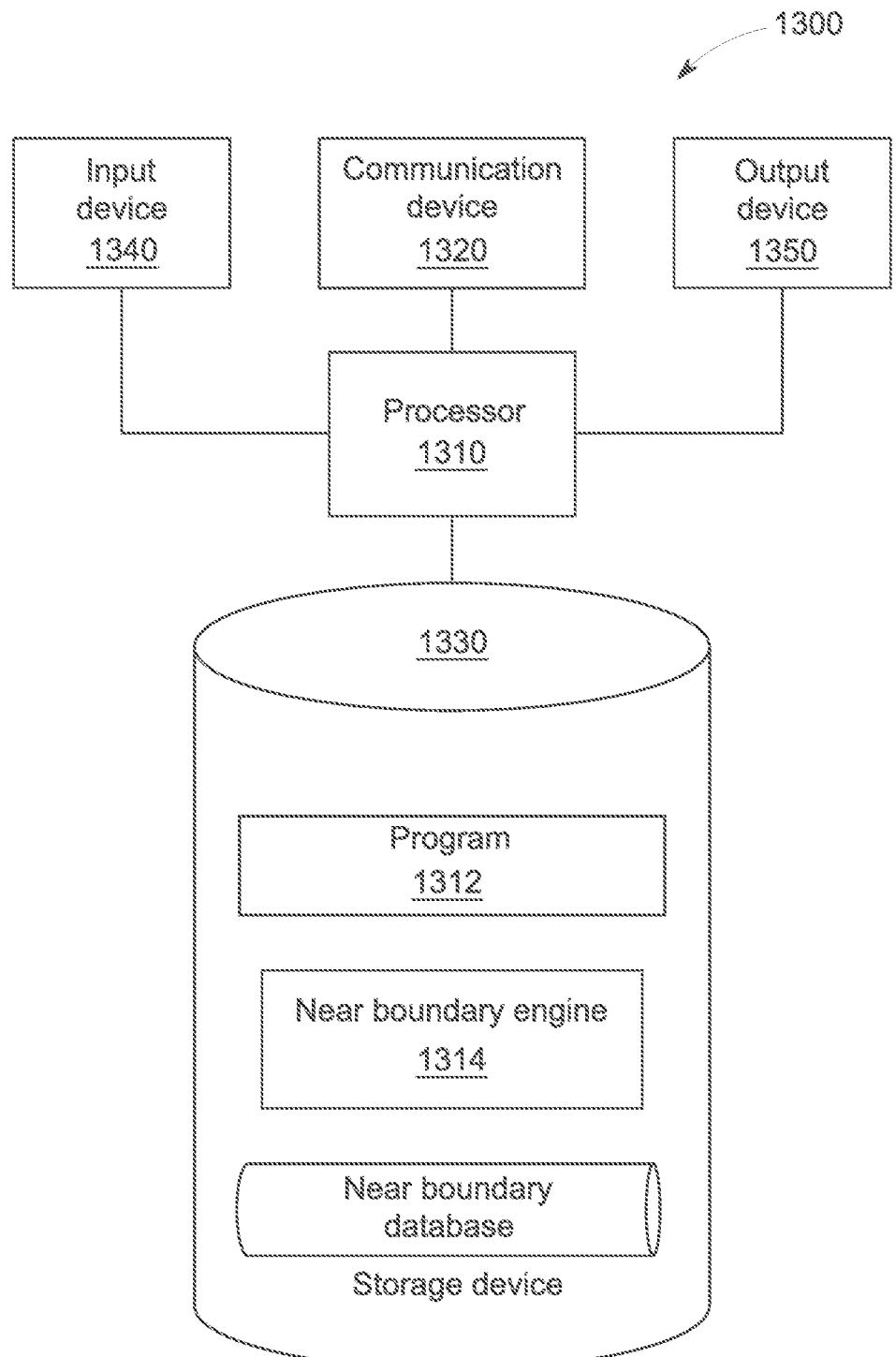
FIG. 13 is a vulnerability platform accordance to some embodiments.

Note that the embodiments described herein may be implemented using any number of different hardware configurations. For example, FIG. 13 is a block diagram of a vulnerability platform 1300 that may be, for example, associated with the systems 200, 300 of FIGS. 2A and 3, respectively, and/or any other system described herein. The vulnerability platform 1300 comprises a processor 1310, such as one or more commercially available Central Processing Units ("CPUs") in the form of one-chip microprocessors, coupled to a communication device 1320 configured to communicate via a communication network (not shown in FIG. 13). The communication device 1320 may be used to communicate, for example, with one or more remote monitoring nodes, user platforms, digital twins, etc. The vulnerability platform 1300 further includes an input device 1340 (e.g., a computer mouse and/or keyboard to input cyber-physical system parameters and/or modeling information) and/an output device 1350 (e.g., a computer monitor to render a display, provide alerts, transmit recommendations, and/or create reports). According to some embodiments, a mobile device, monitoring physical system, and/or PC may be used to exchange information with the cyber-physical system protection platform 1300.

The processor 1310 also communicates with a storage device 1330. The storage device 1330 may comprise any appropriate information storage device, including combinations of magnetic storage devices (e.g., a hard disk drive), optical storage devices, mobile telephones, and/or semiconductor memory devices. The storage device 1330 stores a program 1312 and/or vulnerability engine 1314 for controlling the processor 1310. The processor 1310 performs instructions of the programs 1312, 1314, and thereby operates in accordance with any of the embodiments described herein. For example, the processor 1310 may receive a decision boundary and execute the vulnerability module to determine whether a data value provides a vulnerability for the CPS. The processor 1310 may then output the determined status to a user interface or other system.

The programs 1312, 1314 may be stored in a compressed, uncompiled and/or encrypted format. The programs 1312, 1314 may furthermore include other program elements, such as an operating system, clipboard application, a database management system, and/or device drivers used by the processor 1310 to interface with peripheral devices.

As used herein, information may be "received" by or "transmitted" to, for example: (i) the vulnerability platform 1300 from another device; or (ii) a software application or module within the vulnerability platform 1300 from another software application, module, or any other source.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). Moreover, although some embodiments are focused on gas turbines, any of the embodiments described herein could be applied to other types of cyber-physical systems including power grids, dams, locomotives, airplanes, and autonomous vehicles (including automobiles, trucks, drones, submarines, etc.).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed is:

1. A system comprising:
a memory storing processor-executable steps; and
a processor to execute the processor-executable steps to cause the system to:
receive a first data value of a plurality of data values from a data store, wherein the first data value is from a digital twin model of an industrial asset;
determine, via a vulnerability module, whether the received at least one data value is a near boundary case or not a near boundary case;
in a case it is determined the first data value is a near boundary case,
generate one or more adversarial samples for the first data value;
input each of the one or more adversarial samples to the digital twin model;
execute the digital twin model to output a system response for each input adversarial sample;
determine whether the system response to each input adversarial sample has a negative impact;
in a case it is determined the system response has a negative impact for a given input adversarial sample, update a trained attack detection model with the given input adversarial sample; and
generate a second decision boundary based on the updated trained attack detection model.

2. The system of claim 1, wherein a near boundary case is a data value that is within a near boundary value of an initial decision boundary.

3. The system of claim 2, wherein the initial decision boundary is generated by the trained attack detection model.

4. The system of claim 2, wherein the near boundary value is one of a probability and a vector distance.

5. The system of claim 2, wherein each adversarial sample has a value on an opposite side of the initial decision boundary from the received first data value.

6. The system of claim 5, wherein generating one or more adversarial samples further comprises processor-executable steps to cause the system to:
execute at least one of a random perturbation model and an analytical perturbation model.

7. The system of claim 5, wherein generating one or more adversarial samples further comprises processor-executable steps to cause the system to:
execute a fast gradient sign method adversarial machine learning model, a random perturbation model, a generative adversarial network (GAN) model, and a complementary GAN model.

8. The system of claim 1, wherein the negative impact is determined based on a change of performance of the industrial asset as compared to a threshold value.

9. The system of claim 8, wherein the change of performance is one of observable and non-observable.

10. A computer-implemented method comprising:
receiving a first data value of a plurality of data values from a data store, wherein the first data value is from a digital twin model of an industrial asset;
determining, via a vulnerability module, whether the received at least one data value is a near boundary case or not a near boundary case, wherein a near boundary case is a data value that is within a near boundary value of an initial decision boundary;
in a case it is determined the first data value is a near boundary case,
generating one or more adversarial samples for the first data value;
inputting each of the one or more adversarial samples to the digital twin model;
executing the digital twin model to output a system response for each input adversarial sample;
determining whether the system response to each input adversarial sample has a negative impact;
in a case it is determined the system response has a negative impact for a given input adversarial sample, updating a trained attack detection neural network with the given input adversarial sample; and
generating a second decision boundary based on the updated attack detection model.

11. The computer-implemented method of claim 10, wherein the near boundary value is one of a probability and a vector distance.

12. The computer-implemented method of claim 10, wherein each adversarial sample has a value on an opposite side of the initial decision boundary than the received first data value.

13. The computer-implemented method of claim 12, wherein generating one or more adversarial samples further comprises executing at least one of a random perturbation model and a non-random perturbation model.

14. The computer-implemented method of claim 10, wherein the negative impact is determined based on a change of performance of the industrial asset as compared to a threshold value.

15. A non-transitory computer readable medium storing program code, the program code executable by a computer system to cause the computer system to:
receive a first data value of a plurality of data values from a data store, wherein the first data value is from a digital twin model of an industrial asset;
determine, via a vulnerability module, whether the received at least one data value is a near boundary case or not a near boundary case;
in a case it is determined the first data value is a near boundary case,
generate one or more adversarial samples for the first data value;
input each of the one or more adversarial samples to the digital twin model;
execute the digital twin model to output a system response for each input adversarial sample;
determine whether the system response to each input adversarial sample has a negative impact;
in a case it is determined the system response has a negative impact for a given input adversarial sample, update a trained attack detection neural network with the given input adversarial sample; and
generate a second decision boundary based on the updated attack detection model.

16. The medium of claim 15, wherein a near boundary case is a data value that is within a near boundary value of an initial decision boundary.

17. The medium of claim 16, wherein each adversarial sample has a value on an opposite side of the initial decision boundary than the received first data value.

18. The medium of claim 15, wherein the negative impact is determined based on a change of performance of the industrial asset as compared to a threshold value.

* * * * *